United States Patent [19]

Estes et al.

[11] Patent Number: 4,764,914

[45] Date of Patent: Aug. 16, 1988

[54] LEAST SQUARES METHOD AND APPARATUS FOR DETERMINING TRACK ECCENTRICITY OF A DISK

[75] Inventors: Marvin F. Estes, Elba; Gerald J. Smart, Rochester, both of N.Y.

[73] Assignee: Eastman Kodak Company, Rochester, N.Y.

[21] Appl. No.: 95,185

[22] Filed: Sep. 11, 1987

[51] Int. Cl.$^4$ ............................................. G11B 21/10
[52] U.S. Cl. ........................................ 369/58; 360/77; 369/43; 369/111
[58] Field of Search ...................... 369/54, 58, 44–46, 369/43; 360/25, 31, 77, 78; 358/342

[56] References Cited

U.S. PATENT DOCUMENTS

| | | | |
|---|---|---|---|
| 4,087,842 | 5/1978 | Manly | 360/77 |
| 4,138,741 | 2/1979 | Hedlund et al. | 360/77 |
| 4,365,324 | 12/1982 | Michealis | 360/77 |
| 4,445,144 | 4/1984 | Giddings | 358/342 |
| 4,498,110 | 2/1985 | Kimura | 358/342 |
| 4,530,020 | 7/1985 | Sutton | 360/77 |
| 4,536,809 | 8/1985 | Sidman | 360/77 |
| 4,616,276 | 10/1986 | Workman | 360/77 |
| 4,628,379 | 12/1986 | Andrews, Jr. et al. | 360/77 |
| 4,630,190 | 12/1986 | Alaimo et al. | 360/77 |
| 4,725,968 | 2/1988 | Baldwin et al. | 360/25 |

Primary Examiner—Donald McElheny, Jr.
Attorney, Agent, or Firm—Dennis P. Monteith

[57] ABSTRACT

A transducer head, held in a fixed position as a preformatted disk is rotated a full revolution, reads any sector address accessible to the head. The addresses read come from a plurality of track revolutions that depend on the magnitude of the eccentricity of the disk. A computer, programmed with a least squares algorithm, first coordinates (1) data corresponding to the angular position of the disk each time an address is read, with (2) data corresponding to the actual radius of each address. The computer then transforms the array of data coordinated into a sinusoidal track eccentricity compensating signal of the form $D \cos(wt + E)$ where the amplitude $D$ is a constant computed from the least squares algorithm corresponding to the distance between the center of the disk and its rotational axis, the phase $E$, which is also a constant computed by least squares, corresponds to the angle the center of the disk is from an angular reference position, and $wt$ is a variable equal to the product of disk angular speed and time.

7 Claims, 6 Drawing Sheets

LEAST SQUARES METHOD AND APPARATUS FOR DETERMINING TRACK ECCENTRICITY OF A DISK

BACKGROUND OF THE INVENTION

1. Field Of The Invention

The present invention relates to a method and apparatus for determining track eccentricity of an information-bearing disk.

2. Description Relative To The Background Art

In the following description of relevant background art, reference is made to FIG. 1 of the accompanying drawings which illustrates eccentricity of a record track of a disk system.

With reference to the recording art, tracking is the process of keeping a transducer head on the path of a record track on a storage device. The purpose of tracking control is to adjust the position of the head relative to the record track or vice versa, so that the head is aligned with the centerline of the track for maximizing the signal-to-noise ratio of a record/playback channel.

Of the various causes of tracking error, track eccentricity is often the most severe in a disk system. The problem arises when the center of a disk is not aligned precisely with the rotational axis of a disk drive mechanism. As a result, a track being traced oscillates radially as the disk rotates about its central axis of rotation.

FIG. 1 illustrates the problem. A disk drive spindle 10 has a central axis of rotation 11 at point A; a stationary transducer head 12, located at point B a known distance, R, from A, serves to trace an imaginary circular track 14 of radius R passing through B and centered at A.

Track eccentricity arises when a disk 16 has its center (point C) displaced from the rotational axis 11 at A. Point C is shown generally at a distance epsilon, $\epsilon$, from A and at a phase angle phi, $\phi$, from a radial line 17 related to a predetermined reference position of the rotational axis 11.

The disk 16 has a circular record track 19 (center at C) whose radius is the distance R that the transducer head 12 is from A. If point C were to coincide with A, the record track 19 would be and would remain aligned with the imaginary track 14 when the disk 16 rotates. If that were the case, there would be, of course, no track eccentricity.

With miscentering, however, the center of the disk 16 (point C) follows a circular path 20 of radius $\epsilon$ and center at A as the disk 16 rotates. As C follows path 20, the track 19 moves radially relative to point B of the transducer head 12. A distance, $\Delta$, between B and the point at which track 19 intersects a diametrical line 18 passing through A and B, represents a tracking error caused solely by eccentricity. The distance $\Delta$ varies as a function of the location of point C on the path 20 and is at a maximum $\epsilon$ outside point B when C is aligned with line 18 between A and B and is at maximum $\epsilon$ inside B when C coincides with line 18 on the diametrically opposite side of A. Thus, the point of intersection of the track 19 with the line 18 wanders back and forth within a total range of $2\epsilon$. In this case a sinusoidal signal of amplitude $\epsilon$ and having a fundamental frequency component equal to the rotational speed of the disk and proper phase provides a very good approximation to track eccentricity.

It should be understood that the center C of the disk 16 is shown to be a relatively significant distance from the rotational axis 11 of the drive spindle 10. In actuality, the distance $\epsilon$ is typically no greater than 25 microns—a small percentage of the track radius R.

There are known in the prior art various techniques for achieving tracking control dynamically. A commonly employed method is to preformat a disk with so-called embedded servo information. By this procedure, predetermined signals are recorded along each record track on a disk at precise locations. As these signals are detected, either in a record or a playback mode, a servo system, preferably closed-loop, serves to drive the transducer head radially in an attempt to maintain alignment with the particular record track being traced. Embedded servo information has been found to work well with disks having information-bearing tracks of moderate density such as a rigid magnetic disk. In fact, for a disk system having a relatively low track density, such as is found with some flexible or floppy disk systems, tracking control may be achieved without embedded servo information. A problem arises, however, with a disk system having a relatively high track density, such as a magneto-optical or an optical system, in which track density may be on the order of approximately 6,000 tracks per centimeter. With a system of this type wherein track pitch is less than two microns ($<2\mu$), a discrete tracking signal provided by embedded servo information is not sufficient in itself to maintain tracking control. This is because eccentricity can cause the track to wander radially inwardly and outwardly relative to a transducer head over an annular band containing several concentric tracks. A tracking error of this magnitude can cause complete loss of a desired track during the time interval between adjacent servo signals. With a disk system in which track density is particularly high, eccentricity must be continuously compensated for during operation.

U.S. Pat. No. 4,628,379 discloses apparatus for continuously compensating for eccentricity of a disk storage system. To that end, servo information, stored at discrete points angularly spaced equally relative to the center of the disk, provides information relating the position of a transducer head to disk center. To provide for a continuous compensating factor, a microprocessor uses a discrete Fourier transform technique to fit detected servo information to a sinusoidal waveform defining eccentricity.

A discrete Fourier transform analysis, however, suffers from a disadvantage in that the position information for computing eccentricity is required to be provided at equally spaced points in time. To that end, U.S. Pat. No. 4,628,379 provides servo information aligned in the radial direction. The arrangement of servo information in this pattern is commonly associated with a constant angular velocity (CAV) system. In such a system a disk has the same number of bit cells in each track revolution. Because the length of each track revolution depends on its radius, bit cell density decreases with increasing radius and only the innermost track may have a maximum allowable bit density. Thus, an eccentricity compensating scheme based on a Fourier analysis technique suffers from disadvantages in that it requires servo information arranged in a particular time-ordered pattern which itself is very inefficient in terms of data storage capacity.

SUMMARY OF THE INVENTION

In view of the foregoing, an object of the invention is to provide a method and apparatus for determining the eccentricity of a preformatted disk without, however, requiring that information contained in the preformatted field be arranged in a particular time-ordered pattern.

The object of the invention is achieved by maintaining a transducer head at a fixed radial position while reading radially dependent indicia (preferably sector addresses) in the preformatted field as a drive spindle rotates the disk through a full revolution. A computer, having an input coupled to the transducer head and programmed to include a least squares algorithm, transforms an array of data consisting of (1) the actual radius of each address read, together with (2) the angular position of the disk at the time the corresponding address is read, to a sinusoidal track eccentricity compensating signal of the form $D \cos(wt+E)$ where $D$ and $E$ are constants computed from the least squares algorithm and $wt$ is a variable equal to the product of disk angular velocity and time; the amplitude $D$ of the sinusoidal signal corresponds to the distance between the center of the disk and its rotational axis and the phase $E$ of the signal corresponds to the phase angle of the miscentering (a fixed angle measured relative to an angular reference position of the drive spindle).

An advantage of the invention is that track eccentricity is determined more accurately with increasing track density. This advantage of the invention, as well as the advantage that information read from a preformatted field need not be supplied in a particular time-ordered pattern, will become more apparent in the detailed description of a preferred embodiment presented below.

DESCRIPTION OF THE DRAWINGS

The invention will be described with reference to the accompanying drawings, wherein.

DESCRIPTION OF A PREFERRED EMBODIMENT

Figure 2:
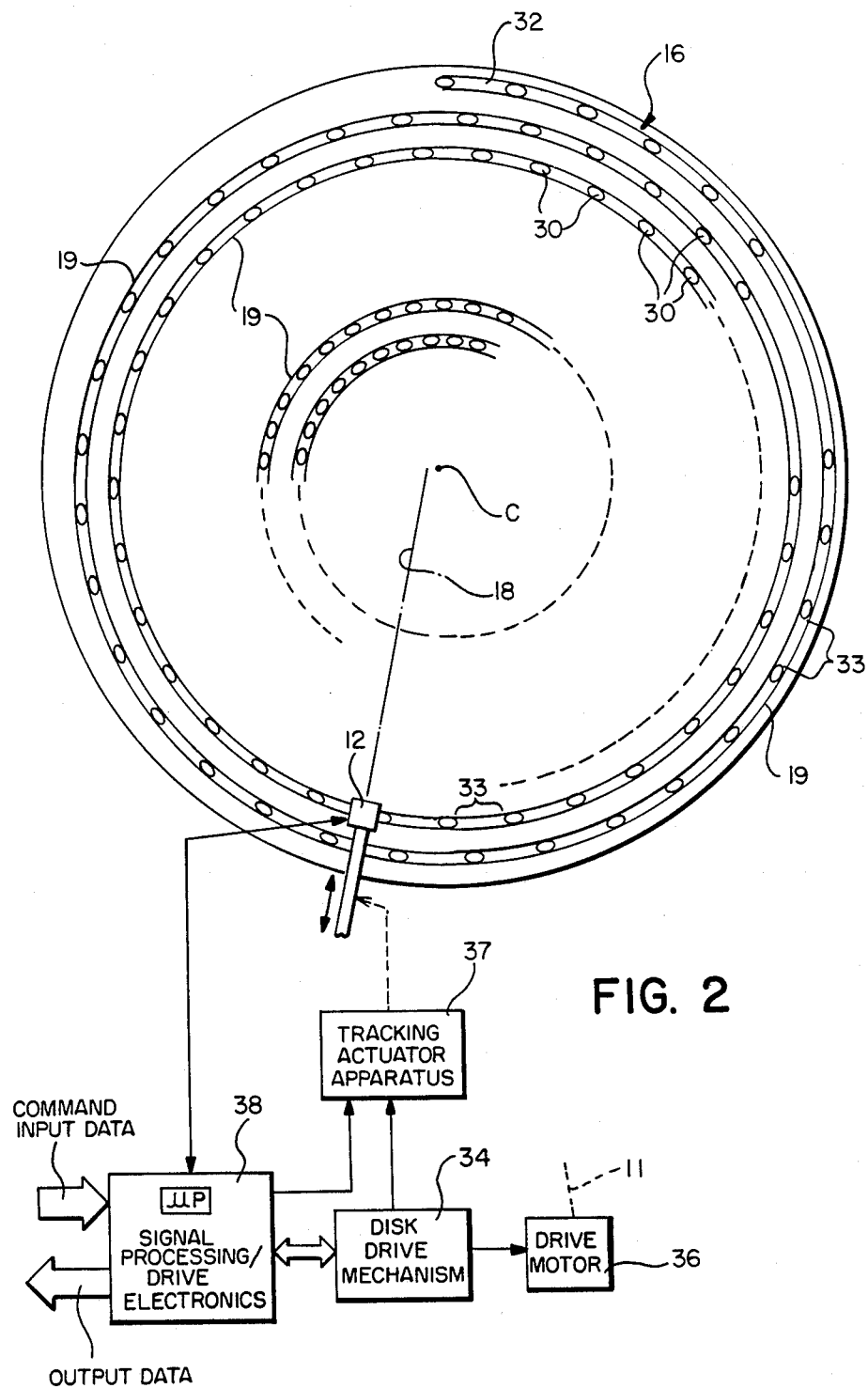
FIG. 2 is a schematic of disk drive apparatus together with an enlarged top view of a disk illustrating an elongate spiral record track having pre-written equally spaced sector addresses.

FIG. 2 shows the aforementioned information-bearing disk 16 having an elongate record track 19 which spirals inwardly about the center C of the disk to form a succession of equally spaced concentric track revolutions of progressively decreasing radii. As made apparent hereinbelow, each track revolution may also be of circular form.

Preferably, the recording surface of the disk 16 is optical, although various alternative surfaces, such as magneto-optical and magnetic, may also be used. Furthermore, both single and double-sided recording may be employed, and that when double-sided recording is used, as is preferred, both planar sides of the disk 16 includes a series of equally spaced concentric track revolutions.

In accordance with a widespread standard, each track revolution is divided into a plurality of preformatted sectors. The sectors serve to divide information on each track into corresponding blocks comprising a predetermined number of bits. The bits within a sector are arranged into two groups. The first group of bits is commonly known as a sector header and the second group, which follows the sector header, is commonly known as a data field. To distinguish the sectors from each other certain bits in each header constitute a sector address 30 which is conveniently numbered sequentially beginning with the outermost track revolution 32 on the disk 16. The addresses 30 are angularly spaced equally, relative to the center C of the disk, throughout the record track 19 such that on any given track revolution they are not aligned radially, as shown, with the addresses on the adjacent revolution (either the adjacent inner or the adjacent outer revolution). For use of the invention to be described, however, each track revolution may have an integer number of sectors and thus the addresses 30 may be aligned radially from one track revolution to any other track.

It should be understood that the bits defining the addresses 30 comprise only a minute percentage of the total number of bits—sector and data—capable of being recorded on the disk; further, the number of track revolutions and the trackwise width shown are merely for generally illustrating the layout of address information. In actuality, the center-to-center spacing of the tracks (track pitch) is so small, particularly with an optical disk, that individual track revolutions are not discernible to the eye.

To record user data on, or play back from, a given sector, a drive mechanism 34 causes a spindle drive motor 36 to rotate the disk 16 about the aforementioned central axis 11 while tracking actuator apparatus 37, also under the control of the drive mechanism 34, causes the transducer head 12 to trace record track 19 by continuous radial movement along the reference line 18. In doing so, the head 12 writes data onto or plays back data from a track sector corresponding to the address provided by a computer-based signal processing/drive electronics 38.

The invention requires a method and apparatus for measuring track eccentricity so that tracking control of the transducer head automatically takes into account eccentricity of the track being traced. A disk is not always reinserted into the same drive mechanism nor is it always possible to return the disk precisely to its previous position even if it is reloaded into the same system; thus, the invention also requires that eccentricity be measured each time that a disk is loaded into a drive mechanism.

Figure 3:
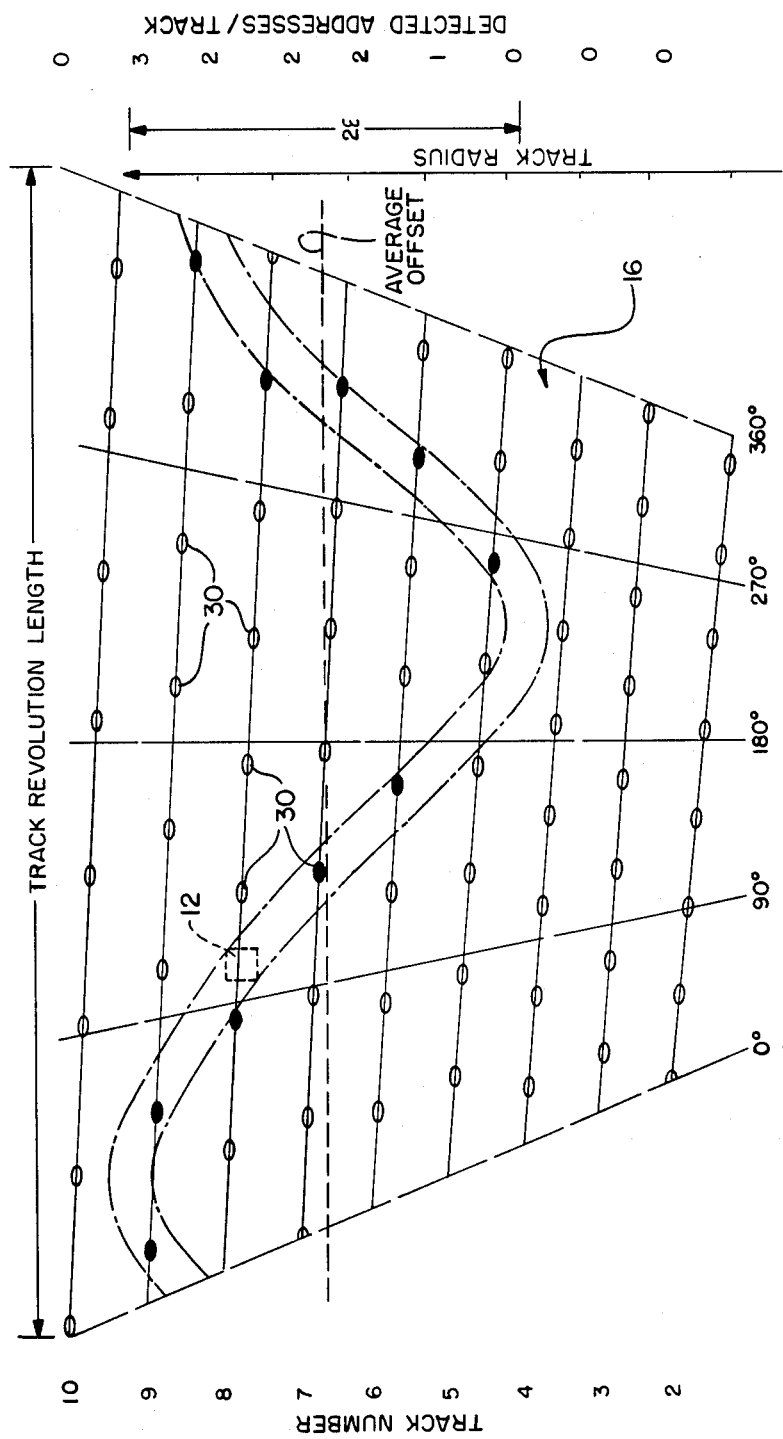
FIG. 3 is an illustration useful in explaining the invention.

FIG. 3 illustrates generally the manner in which data is acquired for determining track eccentricity. The invention requires that the transducer head 12 is held at a fixed position while the disk 16 is rotated through a full revolution (from 0° to 360°). Again, assume that there is a distance $\epsilon$ between the center of the disk 16 and the rotational axis 11 of the drive mechanism 34. From the previous description of track eccentricity, it follows that information from a portion of each track within an annular band of width $2\epsilon$ would be accessible to a stationary transducer head during each full revolution of the disk. Because of the sinusoidal "nature" of track eccentricity, a portion of each track revolution within ±ε on either side of the midpoint of this annular band would sweep past a stationary head. FIG. 3 shows this midpoint as an "average offset" and that track revolutions numbered 4 through 9 are within the distance ε of the average offset and would therefore pass immediately adjacent the transducer head at some time during a disk revolution.

The invention also requires that the stationary transducer head 12 provide output corresponding to each sector address 30 accessible to it as the disk 16 rotates. Because of the sinusoidal characteristic of track eccentricity, each track within ±ε is aligned with the transducer head 12 at two different times during each full revolution of the disk 16. (A track at a radial distance of exactly ε from the average offset would pass beneath the head 12 only one time during a disk revolution.) Accordingly, there would be no more than two time intervals per disk revolution during which sector addresses on a given track could be detected by the transducer head 12.

The actual location of the center of the disk 16 varies randomly each time the disk is loaded into the drive mechanism 16. Thus, both the magnitude (ε) and the phase (φ) of the decenter (FIG. 1) are random variables. For a given track revolution the address(es) 30 that would be detected also vary randomly as a joint function of ε and φ. FIG. 3 shows by the darkened areas those addresses 30 of tracks numbered 3 through 9 that are detected by the transducer head 12. It will be noted that the combination of addresses detected forms a generally sinusoidally shaped pattern.

Further toward achieving the object of the invention, the array of addresses detected is converted to a corresponding array of polar coordinates defining, for each address, its actual radial distance on the disk and disk angular position at the instant the address is detected. A programmable computer of the signal processing/drive electronics 38 then serves, by means of a least squares algorithm, to transform this array of polar coordinates to a sinusoidal track eccentricity compensating signal of the form D cos(wt+E) where D and E are constants derived from the least squares algorithm and correspond, respectively, to the magnitude, represented by ε(FIG. 1), and the phase angle, shown by φ(also FIG. 1), of the miscentering of the disk.

Figure 4:
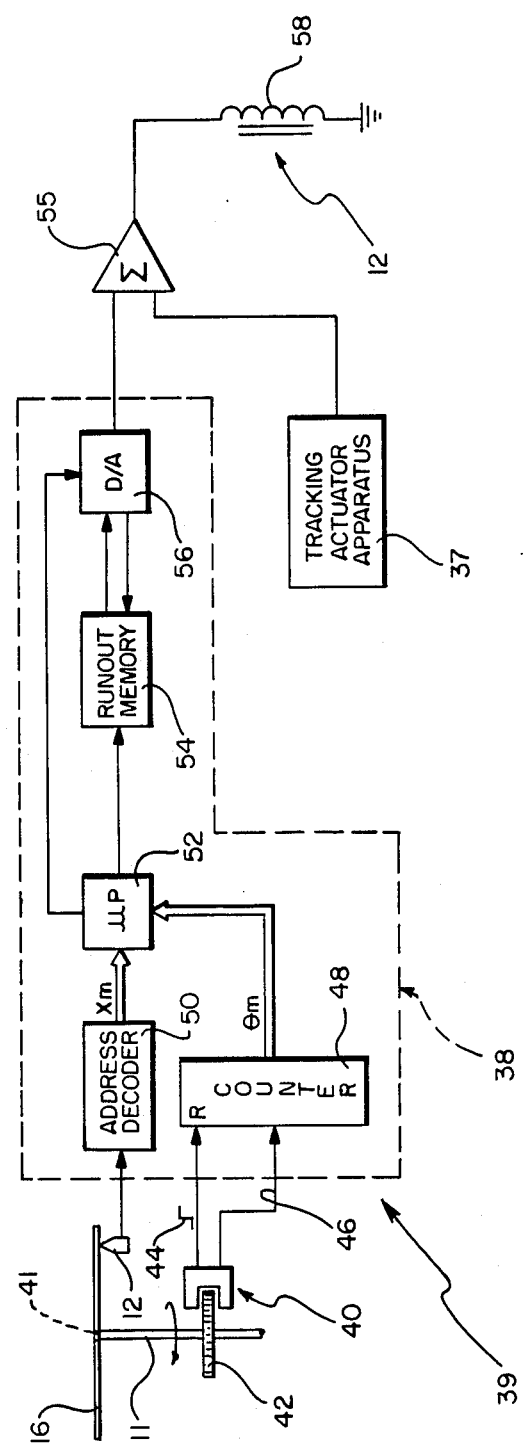
FIG. 4 is a schematic in block diagram form of apparatus, in accordance with the invention, for producing a sinusoidal signal representative of track eccentricity.

FIG. 4 shows a presently preferred embodiment of apparatus 39 in accordance with the invention. An optical encoder 40 serves to produce an output corresponding to the phase of a disk drive spindle 41. To that end, the encoder 40, in response to a reference mark on a flywheel 42 of the disk drive shaft, produces an index pulse 44 at a precise point in time with each rotation of the drive spindle 41. In parallel therewith, the encoder 40 supplies a train of pulses on line 46 corresponding to a predetermined number of equally spaced timing marks on the flywheel 42.

A counter 48 of the signal processing/drive electronics 38 serves to provide a signal representative of the phase of the drive spindle 41 relative to the index pulse 44, and therefore the angular position of the disk. For that purpose, the counter 48 increments a count value in response to each pulse in the "timing mark" train; the counter 48 resets its count value to zero with each index pulse 44.

An address decoder 50, in response to output from the transducer head 12, serves to provide to a programmable computer 52 a parallel bit stream corresponding to each track address detected.

The computer 52 serves to compute a sinusoidal track eccentricity compensating signal of the aforementioned form D cos(wt+E). To that end, the microprocessor 52 is programmed with a least squares algorithm to fit a waveform of the form D cos(wt+E) to data corresponding to the actual radius, $X_m$, and disk angle, $\theta_m$, of each address detected. In particular, the values of D and E, which are constants, are computed which minimize the following function F:

$$F = \sum_{m=1}^{N} \{X_m - [R + D \cos(\theta_m + E)]\}^2$$

where R is equal to the radial distance of the transducer head 12 when addresses are read, and N is the number of addresses detected during one full revolution of the disk.

A runout memory 54 serves to store values corresponding to the track eccentricity compensating signal. To that end, the memory 54, in response to output from the computer 52, stores eccentricity-compensating values sequentially, referenced to the track index pulse 44 and synchronized with each pulse in the train of timing marks from the output of the encoder 40.

A D/A converter 56, responsive to timing provided by the computer 52 and output from the memory 54, serves to convert at the appropriate time each of the values stored in memory 54 to an appropriate drive current.

During an actual data write and/or read operation, the tracking actuator apparatus 37 adjusts the radial position of the transducer head 12 in response to a tracking control signal provided by the disk drive mechanism 34.

Summing circuitry 55 functions to combine the output of the converter 56 with the output of the tracking actuator apparatus 37 for driving a linear tracking motor such as a voice coil 58 jointly as a function of track eccentricity and a nominal tracking control signal, respectively. To that end, the output of the converter 56 is added to the output of the tracking actuator apparatus 37.

Figure 1:
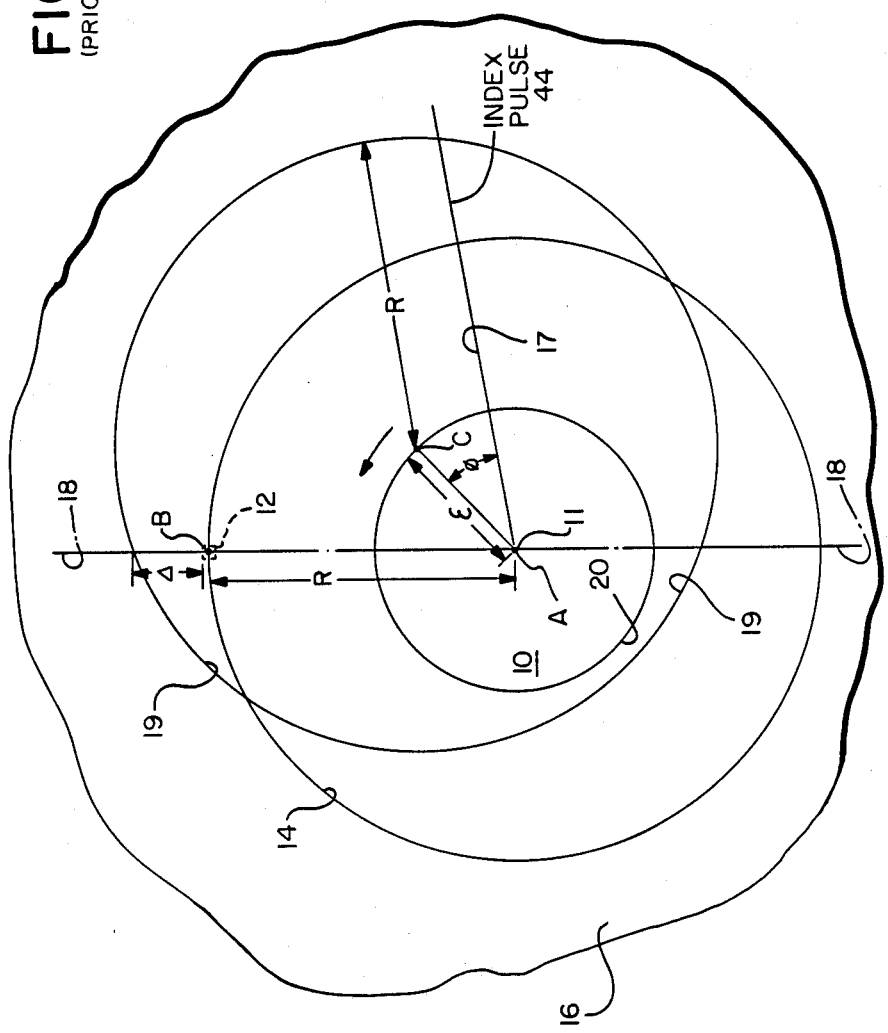
FIG. 1 is a diagram illustrating track eccentricity.

The method of computing track eccentricity will now be described, with particular reference to FIGS. 1 and 5 of the drawings.

Figure 5:
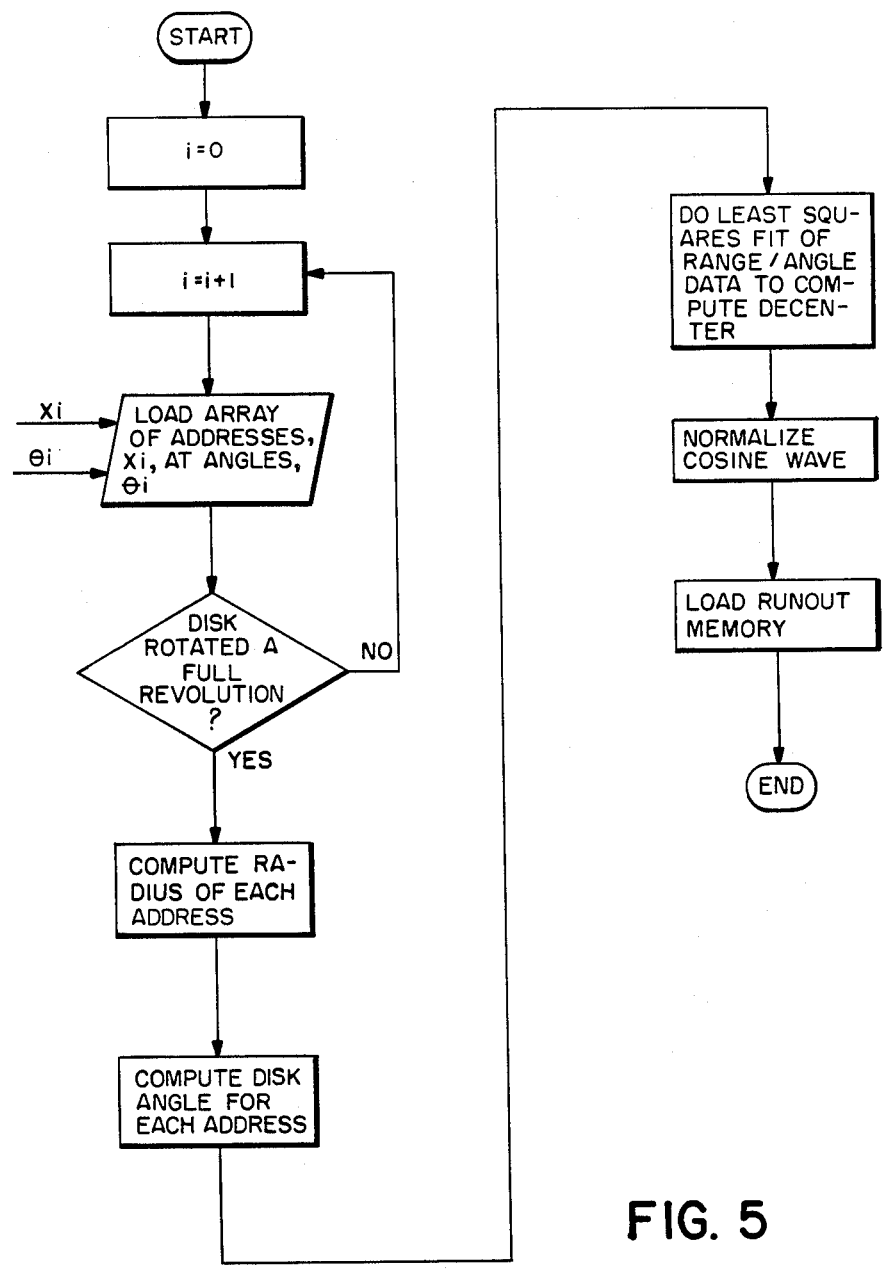
FIG. 5 is a flowchart of a computer program used to compute track eccentricity.

Referring now to the flowchart of FIG. 5, the computer 52 of the signal processing/drive electronics 38 accepts as input, from the address decoder 50 and the counter 48, an array of data consisting respectively of each detected address 30, $X_i$, and the angle $\theta_i$, of the disk 16 when the corresponding address is read. The computer temporarily loads this array of data into memory.

Once the disk 16 rotates through a full revolution (preferably when the counter 48 has counted a predetermined number of pulses corresponding to one complete revolution) the computer 52, under program control, computes the radius of each address. With a spiral record track, each address has a unique radius. The radius of each address could be found by means of a simple computer look-up table. Preferably, however, the computer sorts the addresses stored to find the one that lies furthest from the center of the disk. That address has the largest radius and serves as a reference address. With track pitch and the number of sectors per track revolution known, the radius of each of the other addresses can be determined from the number of sectors separating the reference address and the address whose radius is being computed.

The computer 52 then computes the angular position of the disk 16 at the time each address is detected. To that end, the computer preferably converts the count value provided by the counter 48 at the time each address is supplied by the decoder 50. A count value of zero coincides with the index pulse 44 and corresponds to a disk angle of zero degrees (0°).

Once all the radial distances and corresponding angular positions are computed, the computer 52, by means of its least squares algorithm, fits the radius and corresponding angle data to an equation of the form $R+D\cos(wt+E)$ where D and E are constants computed from the least square algorithm and correspond, respectively, to the magnitude $\epsilon$ and the phase angle $\phi$(FIG. 1) of decenter, R corresponds to the fixed radial position of the transducer head, and wt is the angular position of the disk. The Appendix of this application includes a detailed derivation of the mathematics employed for computing the magnitude and phase angle of the decenter.

The phase $\phi$ of the decenter is referenced to the angular position of the disk 16 when the index pulse 44 occurs. By way of example and without limitation, the phase $\phi$ is shown in FIG. 1 as being approximately $\frac{1}{8}$ of a full revolution (45°) prior to a maximum positive eccentricity ($+\epsilon$) when the disk 16 rotates in a counter-clockwise direction. Since the eccentricity signal is of the form $D\cos(wt+E)$, the phase of decenter, as illustrated in FIG. 1, is a negative forty-five degrees ($-45°$).

Figure 6:
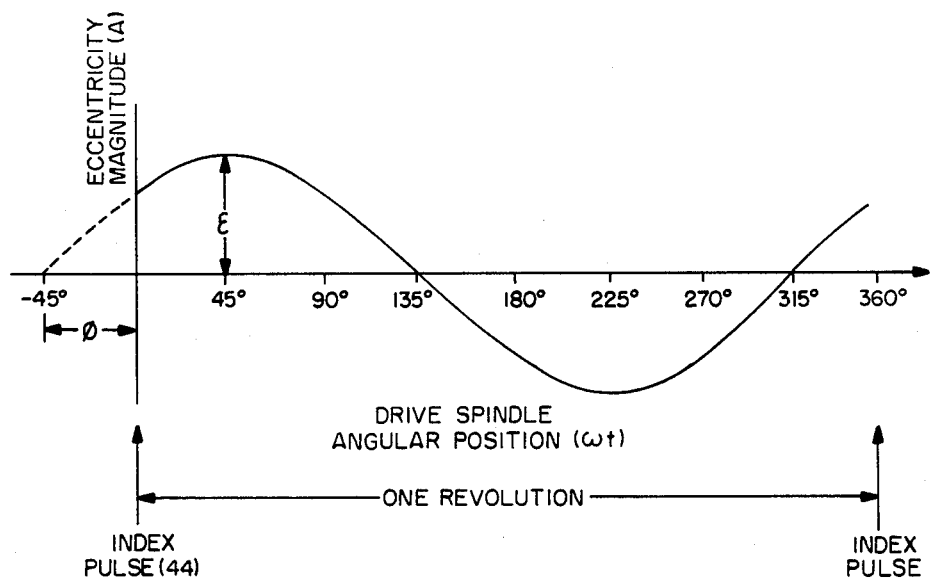
FIG. 6 is a graph illustrating a track eccentricity compensating signal.

Once the constants D and E are computed, track eccentricity is normalized. To that end, the computer 52 stores the values of the sinusoidal signal sequentially in the runout memory 54 according to the angular position of the disk drive spindle 41 as represented by the timing marks on the flywheel 42. FIG. 6 graphically illustrates relative runout values for a phase angle $\phi$ of $-45°$.

ADVANTAGEOUS TECHNICAL EFFECT

From the foregoing, it is apparent that there has been disclosed an improved method and apparatus for determining track eccentricity of a preformatted disk. Unlike the prior art, information in the preformatted field need not be arranged in a particualr time-ordered pattern to determine eccentricity. A particular advantage of this feature is that the preformatted field can take a variety of forms adaptable to efficiently storing user data.

For a given eccentricity, the greater the track density the larger the number of addresses read by a stationary head. A further advantage of the present invention is that with increasing track density, track eccentricity is determined more accurately.

The invention has been described in detail with reference to the figures, however, it will be appreciated that variations and modifications are possible within the spirit and scope of the invention.

APPENDIX $$\sum_{m=1}^{N} \{X_m - [R + D\cos(\theta_m + E)]\}^2 = F$$

$$\sum_{m=1}^{N} \{X_m - R - A_1 \cos\theta_m - A_2 \sin\theta_m\}^2 = F$$

where
$A_1 = D \cos E$
$A_2 = D \sin E$

For a least squares fit:

$$\frac{\partial F}{\partial R} = 0 = \sum_{m=1}^{N} (X_m - R - A_1 \cos\theta_m - A_2 \sin\theta_m) \quad (1)$$

or $$R = \sum_{m=1}^{N} X_m - A_1 \sum_{m=1}^{N} \cos\theta_m - A_2 \sum_{m=1}^{N} \sin\theta_m$$

$$\frac{\partial F}{\partial A_1} = 0 = \sum_{m=1}^{N} \cos\theta_m [X_m - R - A_1 \cos\theta_m - A_2 \sin\theta_m] \quad (2)$$

$$\frac{\partial F}{\partial A_2} = 0 = \sum_{m=1}^{N} \sin\theta_m [X_m - R - A_1 \cos\theta_m - A_2 \sin\theta_m] \quad (3)$$

Substituting for R (equation (1)) in equation (2) produces equation (4) of the form:

$$K_2 A_1 + K_3 A_2 = K_1 \quad (4)$$

where $$K_1 = \Sigma X_m \cos\theta_m - \frac{\Sigma X_m \Sigma \cos\theta_m}{N}$$

$$K_2 = \Sigma \cos^2\theta_m - \frac{[\Sigma \cos\theta_m]^2}{N}$$

$$K_3 = \Sigma \cos\theta_m - \frac{[\Sigma \sin\theta_m][\Sigma \cos\theta_m]}{N}$$

Similarly, substituting for R in equation (3) produces equation (5) of the form:

$$K_3 A_1 + K_5 A_2 = K_4 \quad (5)$$

where $$K_4 = \Sigma X_m \sin\theta_m - \frac{\Sigma X_m \Sigma \sin\theta_m}{N}$$

$$K_5 = \Sigma \sin^2\theta_m - \frac{[\Sigma \sin\theta_m]^2}{N}$$

$A_1$ and $A_2$ are solved for from simultaneous equations (4) and (5) and are of the form:

$$A_1 = \frac{K_1 K_5 - K_3 K_4}{K_2 K_5 - K_3^2} \quad (6)$$

$$A_2 = \frac{K_1 K_3 - K_4 K_2}{K_3^2 - K_2 K_6} \quad (7)$$

Since
$A_1 = D \cos E$ and
$A_2 = D \sin E$, then
$D = A_1^2 + A_2^2$ and
$E = Tan^{-1}(A_2/A_1)$.

What is claimed is:

1. A method of determining eccentricity of a rotatable disk preformatted with individually identifiable indicia spaced along concentric record tracks encircling the center of the disk, said method comprising:

(a) rotating the disk and reading each identifiable indicium accessible to a transducer head which is held at a fixed radial position as the disk is rotated;

(b) coordinating the actual radius of each indicium read with the angular position of the disk at the time the indicium is read; and (c) transforming the array of coordinated pairs of radius and angular position information into a sinusoidal track eccentricity compensating signal the amplitude and the phase of which are constants computed from a least squares algorithm, the amplitude corresponding to the distance between the center of the disk and its rotational axis, the phase corresponding to the angle the center of the disk is from a predetermined angular position of the disk.

2. A method of determining eccentricity of a rotatable disk having addresses spaced along concentric record tracks encircling the center of the disk, said method comprising:

(a) rotating the disk and reading any address accessible to a transducer head which is held at a fixed radial position as the disk is rotated;

(b) coordinating the actual radius of each address read with the angular position of the disk when the address is read; and (c) employing a least squares algorithm to transform the coordinated pairs of radius and angular position information into a periodic track eccentricity compensating signal the amplitude of which is functionally related to the distance the center of the disk is from its rotational axis and the phase of which is functionally related to the angle the center of the disk is from a radial reference position of the disk.

3. A method of determining eccentricity of a rotatable disk preformatted with addresses spaced along concentric record tracks encircling the center of the disk, said method comprising:

(a) rotating the disk and reading each address accessible to a transducer head which is held at a fixed radial position as the disk is rotated;

(b) coordinating the radius of each address read with the angular position of the disk when the address is read; and (c) employing a least squares algorithm to transform the coordinated pairs of radius and angular position information into a track eccentricity compensating signal of the form $D \cos(wt+E)$ where D and E are constants derived from the least squares algorithm, D corresponding to the distance the center of the disk is from its rotational axis, E corresponding to the angle the center of the disk is from an angular reference position of the disk, and wt being a variable equal to the product of angular speed of the disk and time.

4. In apparatus having a playback transducer head for determining eccentricity of a rotatable disk preformatted with individually identifiable indicia spaced along concentric tracks encircling the center of the disk, said apparatus comprising:

(a) a tracking actuator maintaining the transducer head at a fixed radial position to read indicia accessible to the head while the disk is rotated;

(b) memory means for storing data corresponding to the radii of the indicia read and associated data corresponding to the angular position of the disk when the indicia are read; and (c) electronic computer means, having an input coupled to said memory means, programmed to include a least squares algorithm to transform the array of coordinated pairs of radial and angular position information into a sinusoidal track eccentricity compensating signal the amplitude and the phase of which are constants computed from the least squares algorithm, the amplitude corresponding to the distance between the center of the disk and its rotational axis, the phase corresponding to the angle the center of the disk is from a predetermined angular position of the disk.

5. Apparatus as defined in claim 4 further including means, operable during a subsequent data record and/or data playback mode, for applying the track eccentricity compensating signal to said tracking actuator to move the transducer head radially to compensate for track eccentricity.

6. In apparatus having a playback transducer head for determining eccentricity of a rotatable disk having addresses spaced along concentric record tracks encircling the center of the disk, said apparatus comprising:

(a) a tracking actuator maintaining the transducer head at a fixed radial position to read any address accessible to the head while the disk is rotated through a full revolution;

(b) memory means, coupled to the transducer head, for storing (1) data representative of the actual radius of each of the addresses read, and (2) data representative of the angular position of the disk when each address is read; and (c) electronic computer means, having an input coupled to said memory means, programmed to include a least squares algorithm to transform the array of coordinated pairs of radial and angular position information into a periodic track eccentricity compensating signal the amplitude of which is functionally related to the distance the center of the disk is from its rotational axis and the phase of which is functionally related to the angle the center of the disk is from a radial reference position of the disk.

7. In apparatus having a playback transducer head for determining eccentricity of a rotatable disk preformatted with addresses spaced along concentric record tracks encircling the center of the disk, said apparatus comprising:

(a) a drive spindle arranged for rotating the disk about an axis of rotation;

(b) a tracking actuator maintaining the disk at a fixed radial position to read addresses accessible to the head while the disk is rotated;

(c) memory means for storing digital data representative of the actual radius of each address read and data representative of the angular position of the disk at the time each address is read; and (d) digital computer means, having an input coupled to said memory means, programmed to include a least squares algorithm to transform an array of corresponding pairs of radius and angular position information into a track eccentricity compensating signal of the general form $D \cos(wt+E)$ where D and E are constants derived from the least squares algorithm, D corresponding to the distance the center of the disk is from its axis of rotation, E corresponding to the angle the center of the disk is from a radial reference position of the disk, and wt being a variable equal to the product of the rotational speed of the disk and time.

* * * * *